(12) United States Patent
West

(10) Patent No.: US 11,679,888 B2
(45) Date of Patent: Jun. 20, 2023

(54) COMPOSITE PYLON

(71) Applicant: SPIRIT AEROSYSTEMS, INC., Wichita, KS (US)

(72) Inventor: Randall R. West, Wichita, KS (US)

(73) Assignee: Spirit AeroSystems, Inc., Wichita, KS (US)

( * ) Notice: Subject to any disclaimer, the term of this patent is extended or adjusted under 35 U.S.C. 154(b) by 395 days.

(21) Appl. No.: 17/073,583

(22) Filed: Oct. 19, 2020

(65) Prior Publication Data

US 2022/0119122 A1 Apr. 21, 2022

(51) Int. Cl.
*B64D 27/26* (2006.01)

(52) U.S. Cl.
CPC ........ *B64D 27/26* (2013.01); *B64D 2027/264* (2013.01)

(58) Field of Classification Search
CPC .......................... B64D 27/26; B64D 2027/264
See application file for complete search history.

(56) References Cited

U.S. PATENT DOCUMENTS

| | | | |
|---|---|---|---|
| 8,205,825 B2 | 6/2012 | Huggins et al. | |
| 2010/0090056 A1* | 4/2010 | Gardes | B64D 27/26 244/54 |
| 2010/0133376 A1* | 6/2010 | Foyer | B64D 27/26 244/54 |
| 2010/0147997 A1* | 6/2010 | Martinou | B64D 27/26 244/54 |
| 2011/0011972 A1 | 1/2011 | Vache | |
| 2015/0013142 A1* | 1/2015 | West | B64D 27/26 29/525.08 |
| 2017/0259906 A1* | 9/2017 | Connelly | B64D 27/26 |

* cited by examiner

*Primary Examiner* — Christopher D Hutchens
*Assistant Examiner* — Steven J Shur
(74) *Attorney, Agent, or Firm* — Hovey Williams LLP

(57) ABSTRACT

A composite aircraft engine pylon comprising a frame, an aircraft attachment component, and an engine support. The frame includes an outer structural section and an inner structural section configured to at least partially nest with the outer structural section. The outer structural section and the inner structural section sandwich the airframe attachment component and the engine support to form double shear connections between the frame and the aircraft attachment component and between the frame and the engine support.

14 Claims, 9 Drawing Sheets

COMPOSITE PYLON

BACKGROUND

Incorporating composite materials into traditionally metallic structures presents many challenges. For example, a composite aircraft engine pylon must accommodate attachment and support interfaces that introduce large magnitude loads. Failure of or damage to a single load bearing component must not result in catastrophic failure of the pylon. This makes damage tolerance and fail-safety requirements difficult to meet. Furthermore, incorporating a monolithic composite structure in close proximity to concentrated high temperatures, such as those found in and near an aircraft engine, requires the entire monolithic composite structure to be made of higher cost materials via complex manufacturing techniques.

SUMMARY

Embodiments of the invention solve the above-mentioned problems and other problems and provide a distinct advancement in the art of composite aircraft engine pylons. More particularly, the invention provides a composite pylon that incorporates double-shear connections and/or fail-safe alternate load paths between components and may include certain components made of elevated or high heat grade materials.

An embodiment of the invention is a composite pylon broadly comprising a frame, left and right airframe attachment components, an aft airframe stabilizer component, an upper airframe stabilizer component, left and right aft engine supports, and a forward engine support.

The frame includes an outer structural section and an inner structural section. The frame forms an elongated box or tube structure and may taper in overall cross-sectional area from its distal end to its forward end.

The outer structural section is U-shaped and includes left and right outer airframe attachment elements, left and right outer engine support elements, and left and right engine support openings. The outer structural section is described herein as a lower portion of the frame, but it may take one of several different orientations.

The left and right outer airframe attachment elements abut the left and right airframe attachment components. The left and right outer airframe attachment elements are substantially similar, with each being a vertical tab, flange, or joggle (an outwardly offset vertical portion) of the outer structural section. The left outer airframe attachment element and a left inner airframe attachment element of the inner structural section form a space in which an anchor of the left airframe attachment component is nested. Similarly, the right outer airframe attachment element and a right inner airframe attachment element of the inner structural section form a space in which an anchor of the right airframe attachment component is nested.

The left and right outer engine support elements accommodate the left and right aft engine supports. The left and right outer engine support elements are substantially similar, with each being a vertical tab, flange, or joggle (an outwardly offset vertical portion) of the outer structural section. The left outer engine support element and a left inner engine support element of the inner structural section form a space in which an anchor of the left aft engine support is nested. Similarly, the right outer engine support element and a right inner engine support element of the inner structural section form a space in which an anchor of the right aft engine support is nested.

The left and right engine support openings accommodate the left and right aft engine supports therethrough. The left and right engine support openings are substantially similar, with each being a cutout, a slot, a hole, a material gap, or the like.

The inner structural section is inverted U-shaped and includes left and right inner airframe attachment elements, left and right inner engine support elements, and may contain a number of reinforcement ribs. The inner structural section is described as an upper portion of the frame, but it may take one of several different orientations.

The left and right inner airframe attachment elements abut the left and right airframe attachment components opposite the left and right outer airframe attachment elements. The left and right inner airframe attachment elements are substantially similar, with each being a vertical tab, flange, or joggle (an inwardly offset vertical portion) of the inner structural section.

The left and right inner engine support elements abut the left and right aft engine supports opposite the left and right outer engine support elements. The left and right inner engine support elements are substantially similar, with each being a vertical tab, flange, or joggle (an inwardly offset vertical portion) of the inner structural section.

The left and right airframe attachment components are substantially similar and each includes an anchor, left and right connection tabs, and a reinforcement flange. The anchor is a downward extending tab connected between airframe attachment elements of the outer structural section and the inner structural section. The anchor thereby forms a double shear connection with the outer structural section and the inner structural section.

The left and right connection tabs are parallel to each other and each includes a fastener hole aligned with the fastener hole of the other connection tab. The left and right connection tabs flank an airframe connection point with a fastener extending through the left connection tab, the airframe connection point, and the right connection tab.

The aft airframe stabilizer component is anchored in an aft airframe stabilizer component slot of the outer structural section and includes a fastener hole. The aft airframe stabilizer component protrudes out of the frame and connects to the end of an airframe attachment link to stabilize the composite pylon relative to the airframe below the airframe connection point.

The upper airframe stabilizer component is positioned on the inner structural section and includes a fastener hole. The upper airframe stabilizer component connects to the end of another airframe attachment link to stabilize the composite pylon relative to the airframe in front of the airframe connection point.

The left and right aft engine supports are substantially similar and each includes an anchor and a connection point. The left and right aft engine supports are the primary attachment points between an engine and the composite pylon.

The anchor is an elongated tab sandwiched between one of the engine support elements and one of the engine support tabs. The engine supports thereby form double shear connections with the outer structural section and the inner structural section.

The forward engine support extends forward from a front end of the frame and may include an engine connection point. The forward engine support may be sandwiched between portions of the outer structural section and the inner structural section to form a double shear connection therewith.

The above-described composite pylon provides several advantages. For example, the left outer and inner airframe attachment elements and the right outer and inner airframe attachment elements form double shear connections with the left and right airframe attachment components. Similarly, the left outer engine support element and the left inner engine support element, and the right outer engine support element and the right inner engine support element form double shear connections with the left and right aft engine supports. Sandwiching these components accommodates substantial loads and distributes loading into adjacent frame components.

Components of the composite pylon may be made of different materials. For example, the forward engine support may be made of metallic and/or high temperature (hotter than elevated) composite materials to withstand high temperature and fire from the aircraft engine. The outer structural section may be made of heat-resistant material for withstanding elevated temperatures near the aircraft engine.

Another embodiment of the invention is a composite pylon broadly comprising a frame, left and right aft engine supports, and a forward engine support. The composite pylon is similar to the composite pylon described above except that integrated airframe attachment lugs are used instead of airframe attachment components.

The frame includes an outer structural section and an inner structural section. The frame forms an elongated box or tube structure and may taper in overall cross-sectional area from its distal end to its forward end.

The outer structural section is U-shaped and includes left and right outer airframe attachment lugs, left and right outer engine support elements, and left and right engine support openings. The outer structural section is described as a lower portion of the frame, but it may take one of several different orientations.

The left and right outer airframe attachment lugs connect the composite pylon to an airframe. The left and right outer airframe attachment lugs are substantially similar, with each being an upward extension of the outer structural section. A fastener hole of the left outer airframe attachment lug aligns with a fastener hole of a left inner airframe attachment lug of the inner structural section. The left outer airframe attachment lug and the left inner airframe attachment lug form fail-safe alternate load paths. Similarly, a fastener hole of the right outer airframe attachment lug aligns with a fastener hole of a right inner airframe attachment lug of the inner structural section. The right outer airframe attachment lug and the right inner airframe attachment lug form fail-safe alternate load paths.

The inner structural section is inverted U-shaped and includes left and right inner airframe attachment lugs and left and right inner engine support elements. The inner structural section is described as an upper portion of the frame, but it may take one of several different orientations.

The left and right inner airframe attachment lugs connect the composite pylon to the airframe. The left and right inner airframe attachment lugs are substantially similar, with each being an upward extension of the inner structural section. A fastener hole of the left inner airframe attachment lug aligns with the fastener hole of the left outer airframe attachment lug. The left outer airframe attachment lug and the left inner airframe attachment lug form fail-safe alternate load paths. Similarly, the right outer airframe attachment lug and the right inner airframe attachment lug form fail-safe alternate load paths.

The above-described composite pylon provides several advantages. For example, the left outer airframe attachment lug and the left inner airframe attachment lug, and the right outer airframe attachment lug and the right inner airframe attachment lug eliminate the need for integrating separate attachment components. These "back-to-back" lug pairs form fail-safe alternate load paths. The lugs may be further enhanced by including additional components such as a metallic plate or plates sandwiched by or sandwiching each pair of lugs.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the preferred embodiments and the accompanying drawing figures.

BRIEF DESCRIPTION OF THE DRAWING FIGURES

Embodiments of the present invention are described in detail below with reference to the attached drawing figures, wherein.

Figure 1:
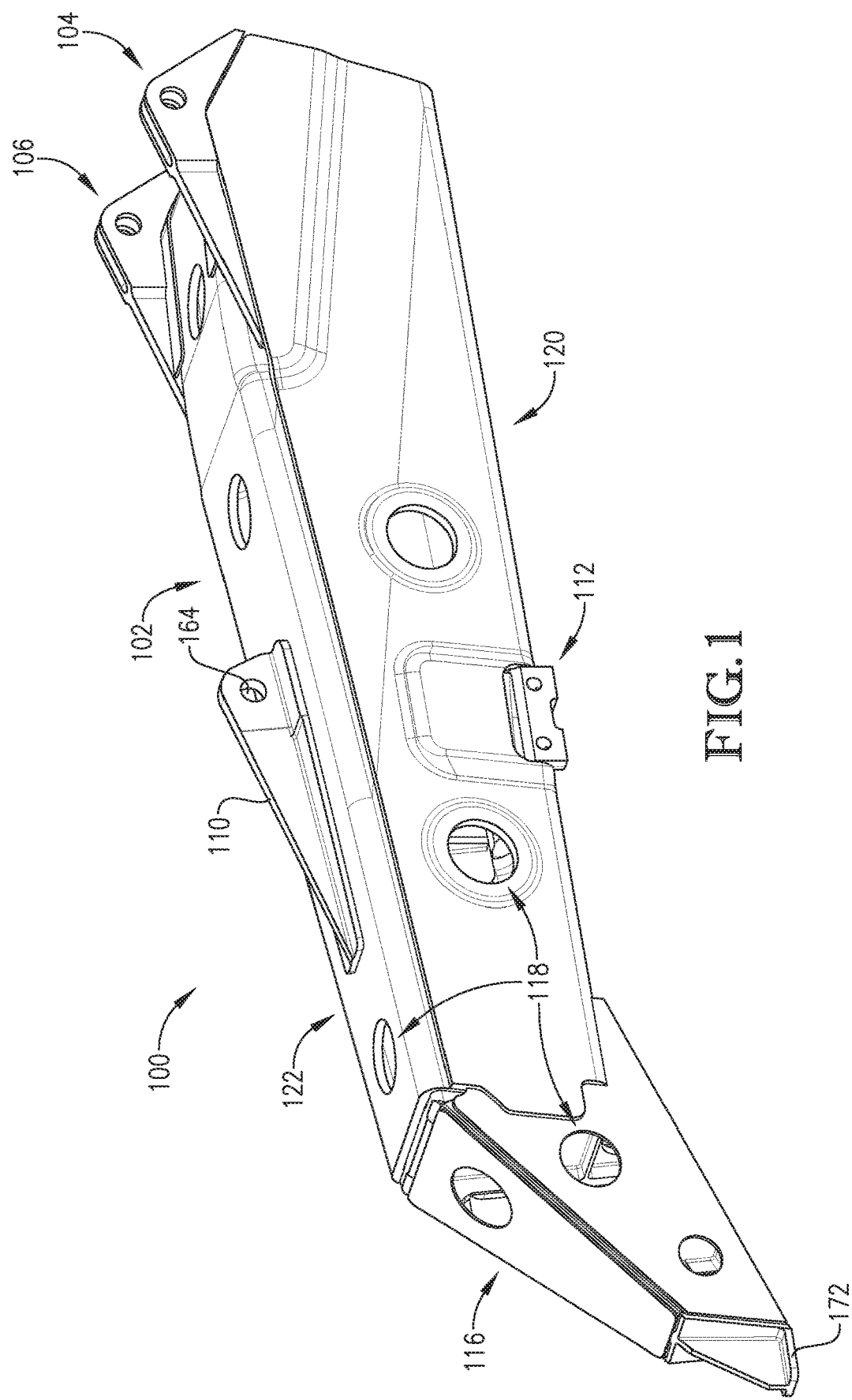
FIG. 1 is a perspective view of a composite pylon constructed in accordance with an embodiment of the invention.
Figure 2:
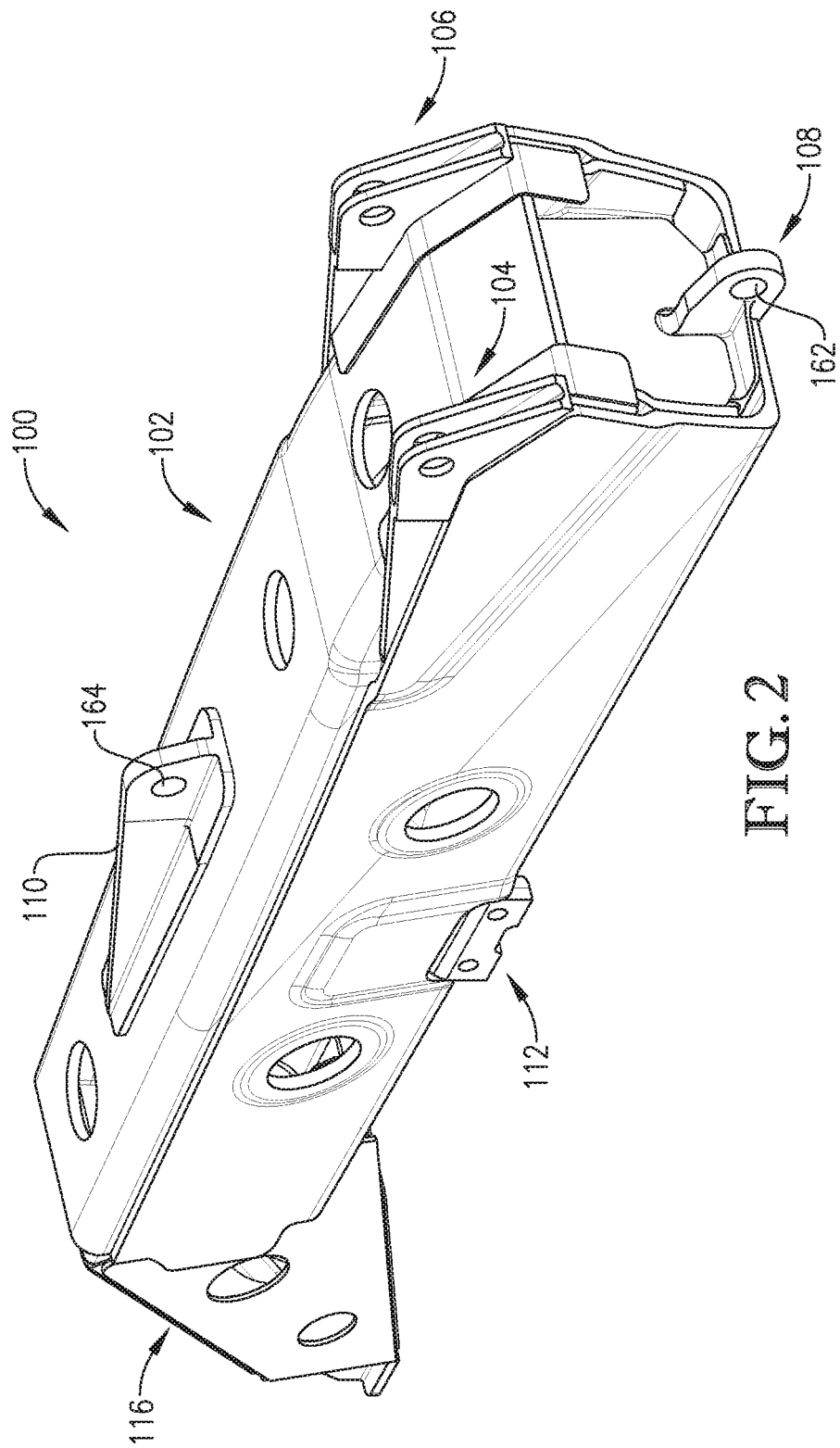
FIG. 2 is another perspective view of the composite pylon of FIG. 1.
Figure 3:
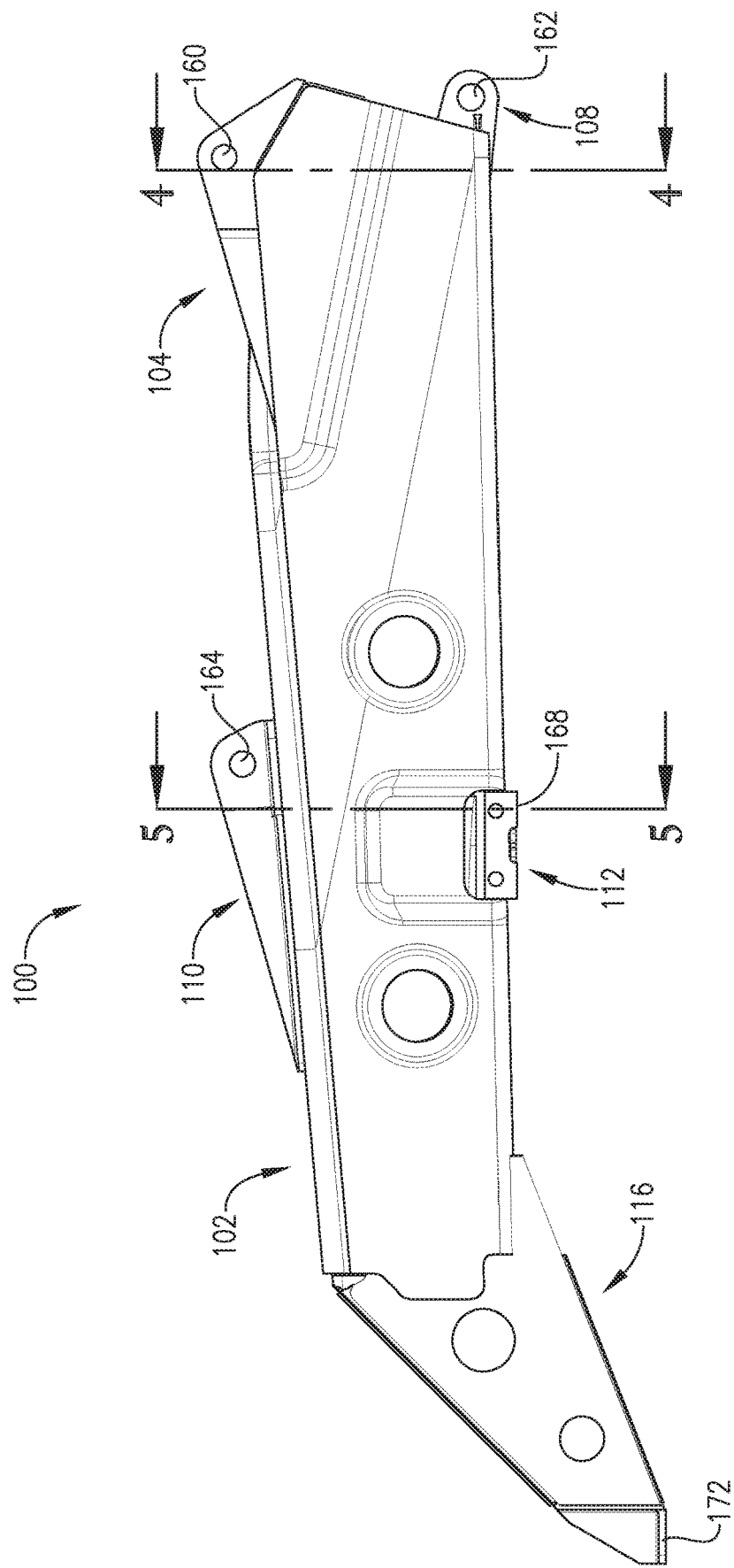
FIG. 3 is a side elevation view of the composite pylon of FIG. 1.
Figure 5:
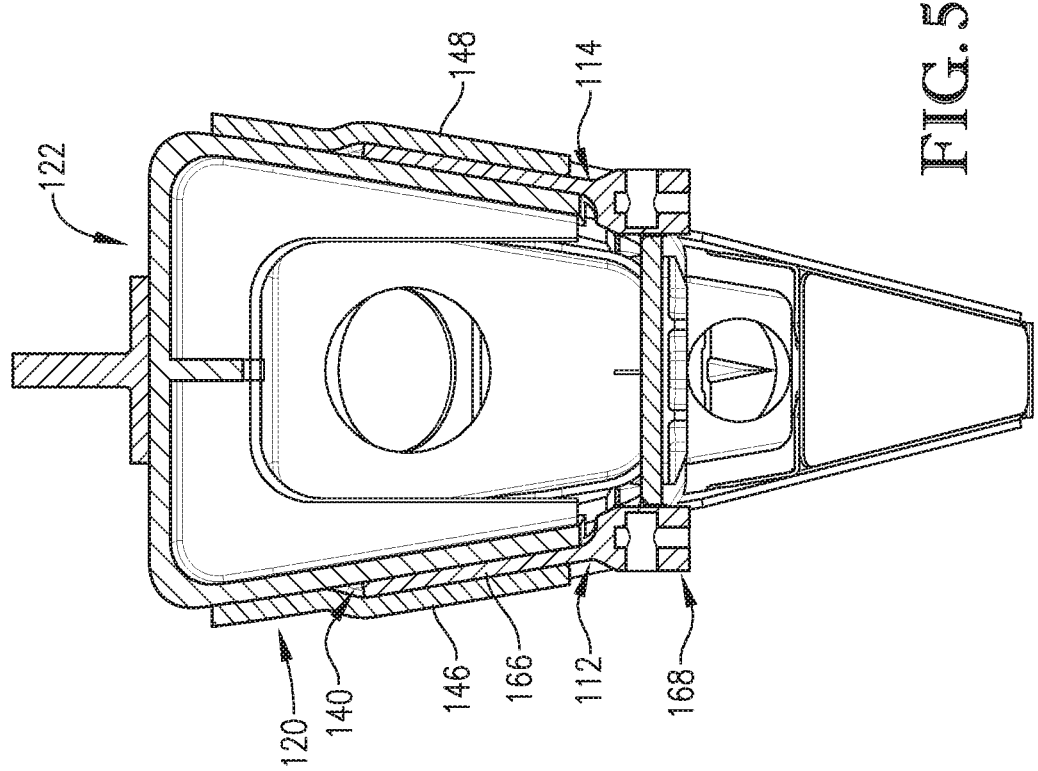
FIG. 5 is another cutaway elevation view of the composite pylon of FIG. 1.
Figure 4:
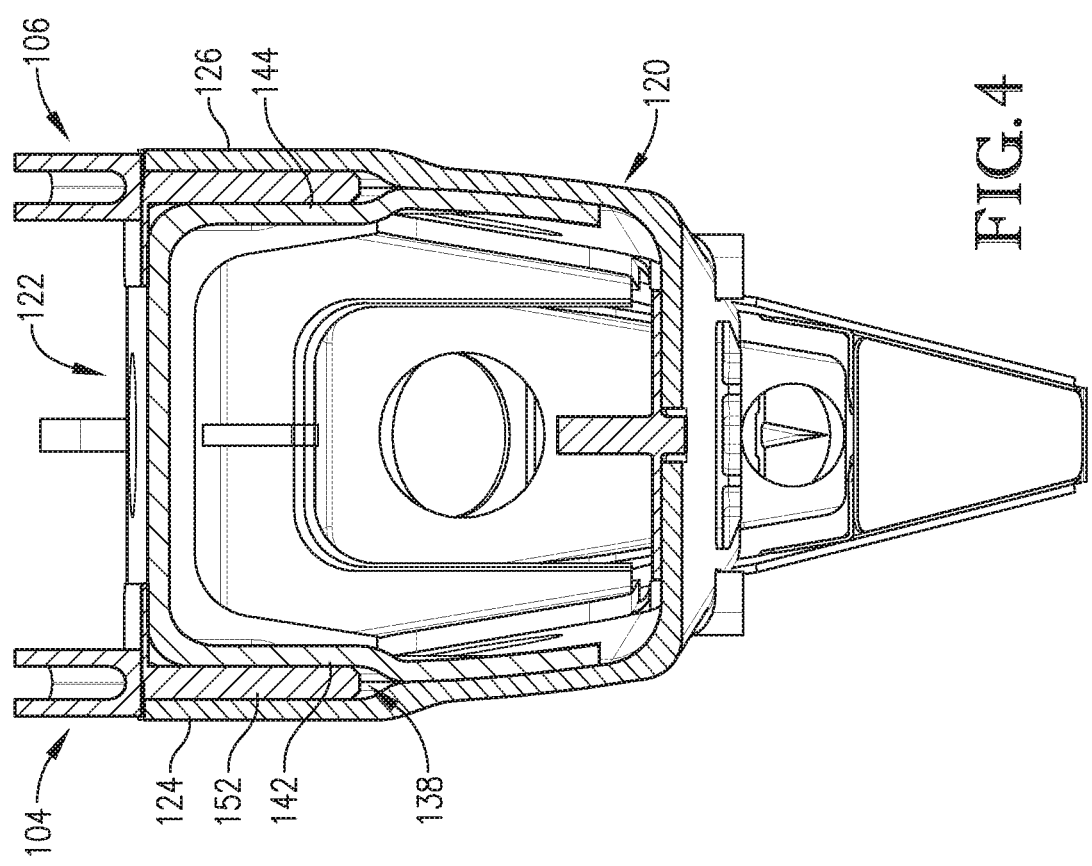
FIG. 4 is a cutaway elevation view of the composite pylon of FIG. 1.
Figure 6:
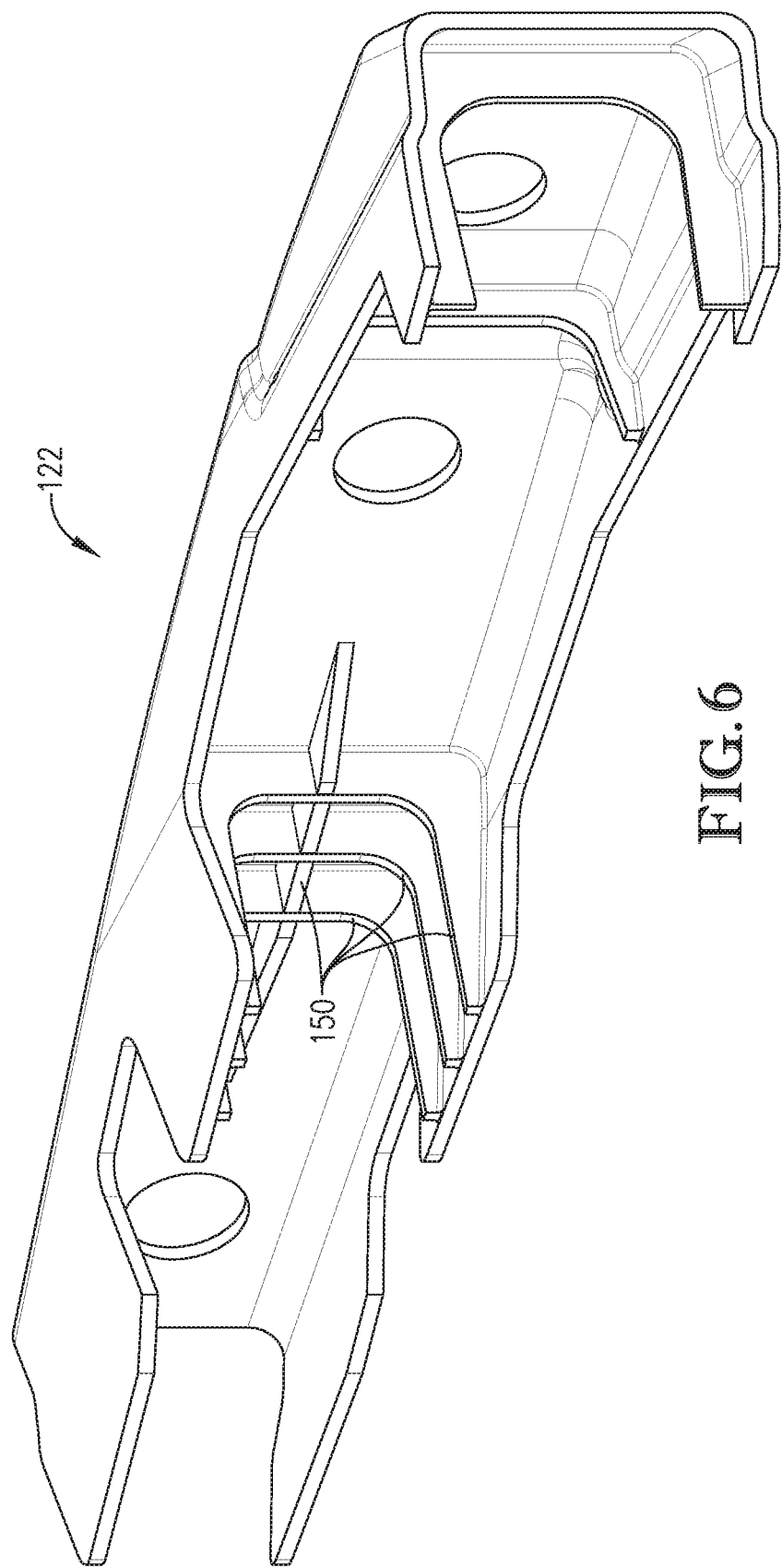
FIG. 6 is a bottom perspective view of a component of the composite pylon of FIG. 1.
Figure 7:
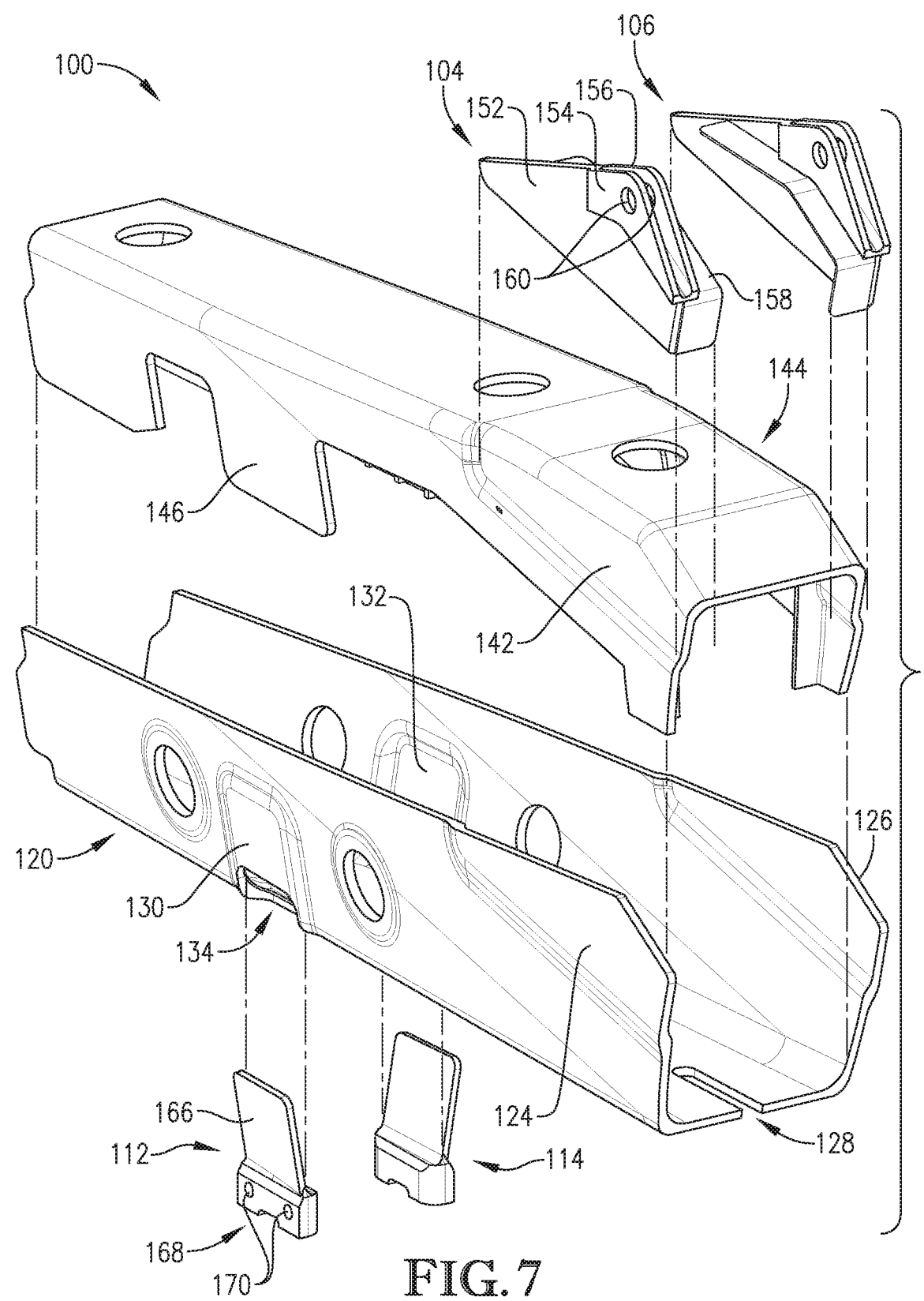
FIG. 7 is an exploded view of the composite pylon of FIG. 1.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein. Directional terms such as "longitudinal" and "lateral" are generally in reference to a standard aircraft orientation. For example, longitudinal features may be generally aligned with the aircraft's primary direction of travel while lateral features may extend horizontally perpendicular to the aircraft's primary direction of travel.

Turning to FIGS. 1-7, a composite pylon 100 constructed in accordance with an embodiment of the invention is illustrated. The composite pylon 100 broadly comprises a frame 102, left and right airframe attachment components 104, 106, an aft airframe stabilizer component 108, an upper airframe stabilizer component 110, left and right aft engine supports 112, 114, and a forward engine support 116. The composite pylon 100 may also include several lightening holes 118.

The frame 102 includes an outer structural section 120 and an inner structural section 122. The frame 102 forms an elongated box or tube structure and may taper in overall cross-sectional area from its distal end to its forward end.

The outer structural section 120 is a U-shaped member including left and right outer airframe attachment elements 124, 126, an aft airframe stabilizer component slot 128, left and right outer engine support elements 130, 132, and left and right engine support openings 134, 136. The outer structural section 120 is shown as a lower portion of the frame 102, but it may take one of several different orientations. For example, the outer structural section 120 may be an inverted U-shaped upper portion of the frame 102. In one embodiment, the outer structural section 120 may be made of heat-resistant material for withstanding elevated temperatures found near an aircraft engine.

The left and right outer airframe attachment elements 124, 126 accommodate the left and right airframe attachment components 104, 106 as described in more detail below. The left and right outer airframe attachment elements 124, 126 are substantially similar so only left outer airframe attachment element 124 will be described in detail.

The left outer airframe attachment element 124 may be a vertical tab, flange, or joggle (an outwardly offset vertical portion) of the outer structural section 120. The left outer airframe attachment element 124 and a left inner airframe attachment element of the inner structural section 122 (described below) form a space 138 in which an anchor of the left airframe attachment component 104 is nested.

The aft airframe stabilizer component slot 128 receives the aft airframe stabilizer component 108. The aft airframe stabilizer component slot 128 may be centrally located on a bottom aft end of the outer structural section 120.

The left and right outer engine support elements 130, 132 accommodate the left and right aft engine supports 112, 114. The left and right outer engine support elements 130, 132 are substantially similar so only left outer engine support element 130 will be described in detail.

The left outer engine support element 130 may be a vertical tab, flange, or joggle (an outwardly offset vertical portion) of the outer structural section 120. The left outer engine support element 130 and a left inner engine support element of the inner structural section 122 (described below) form a space 140 in which an anchor of the left aft engine support 112 is nested.

The left and right engine support openings 134, 136 accommodate the left and right aft engine supports 112, 114 therethrough. The left and right engine support openings 134, 136 are substantially similar so only left engine support opening 134 will be described in detail.

The left engine support opening 134 may be a cutout, a slot, a hole, or a material gap. The left engine left engine support opening 134 may coincide with a lower edge of the frame 102.

The inner structural section 122 is an inverted U-shaped member including left and right inner airframe attachment elements 142, 144, left and right inner engine support elements 146, 148, and a plurality of reinforcement ribs 150. The inner structural section 122 is shown as an upper portion of the frame 102, but it may take one of several different orientations. For example, the inner structural section 122 may be a U-shaped lower portion of the frame 102. The inner structural section 122, not being directly exposed to elevated temperatures, may be made of a different material than the outer structural section 120. Depending on the size and structural requirements of the pylon, the inner structural section 122 may be a shell configuration not requiring reinforcing ribs.

The left and right inner airframe attachment elements 142, 144 accommodate the left and right airframe attachment components 104, 106 as described in more detail below. The left and right inner airframe attachment elements 124, 126 are substantially similar so only left inner airframe attachment element 142 will be described in detail.

The left inner airframe attachment element 142 may be a vertical tab, flange, or joggle (an inwardly offset vertical portion) of the inner structural section 122. The left inner airframe attachment element 142 and the left outer airframe attachment element 124 of the outer structural section 120 form the space 138 in which an anchor of the left airframe attachment component 104 is nested.

The left and right inner engine support elements 146, 148 abut the left and right aft engine supports 112, 114. The left and right inner engine support elements 146, 148 are substantially similar so only left inner engine support element 146 will be described in detail.

The left inner engine support element 146 may be a vertical tab, flange, or joggle (an inwardly offset vertical portion) of the inner structural section 122. The left inner engine support element 146 and the left outer engine support element 130 form the space 140 in which an anchor of the left aft engine support 112 is nested.

The reinforcement ribs 150 are strategically placed buttresses that help prevent buckling or warping of the frame 102 under the weight of the engine. The reinforcement ribs 150 may include lateral ribs, longitudinal spines, crossmembers, a material matrix, or any other suitable features for strengthening the frame 102.

The left and right airframe attachment components 104, 106 are substantially similar so only left airframe attachment component 104 will be described in detail. The left airframe attachment component 104 includes an anchor 152, left and right connection tabs 154, 156, and a reinforcement flange 158.

The anchor 152 is a downward extending tab connected between the left outer airframe attachment element 124 and the left inner airframe attachment element 142. The anchor 152 thereby forms a double shear connection with the outer structural section 120 and the inner structural section 122.

The left and right connection tabs 154, 156 are parallel to each other and each include a fastener hole 160 aligned with the fastener hole of the other connection tab. The left and right connection tabs 154, 156 flank an airframe connection point with a fastener extending through the left connection tab 154, the airframe connection point, and the right connection tab 156.

The reinforcement flange 158 extends substantially perpendicular to the anchor 152 and abuts the inner structural section 122. The reinforcement flange 158 supports the left airframe attachment component 104 and distributes forces to the frame 102.

The aft airframe stabilizer component 108 is anchored in the aft airframe stabilizer component slot 128 and includes a fastener hole 162. The aft airframe stabilizer component 108 protrudes out of the frame 102 and connects to the end of an airframe attachment link via a fastener to stabilize the composite pylon 100 relative to the airframe below the airframe connection point.

The upper airframe stabilizer component 110 is positioned on the inner structural section 122 and includes a fastener hole 164. The upper airframe stabilizer component 110 connects to the end of another airframe attachment link via a fastener to stabilize the composite pylon 100 relative to the airframe in front of the airframe connection point.

The left and right aft engine supports 112, 114 are substantially similar so only left aft engine support 112 will be described in detail. The left aft engine support 112 includes an anchor 166 and a connection point 168.

The anchor 166 is an elongated tab sandwiched between the left outer engine support element 130 and the left inner engine support element 146 in the space 140. The left aft engine support 112 thereby forms a double shear connection with the outer structural section 120 and the inner structural section 122. The connection point 168 protrudes out of the left engine support opening 134 and includes a number of fastener holes 172 for connecting to an engine support link.

The forward engine support 116 extends forward from a front end of the frame 102 and may include an engine connection point 172. The forward engine support 116 may taper significantly more than the frame 102 and may extend diagonally downward from the frame 102. The forward engine support 116 may be sandwiched between portions of the outer structural section 120 and the inner structural section 122 to form a double shear connection therewith. To that end, extensions and additional features to the outer structural section 120 and/or inner structural section 122 may be required. The forward engine support 116 may be made of metallic and high temperature (hotter than elevated) composite materials to withstand high temperature and fire from the aircraft engine.

The engine connection point 168 may include fastener holes or the like for connecting to an engine attachment link. Alternatively, the connection point 168 may connect directly to the engine.

The lightening holes 118 reduce the overall weight of the composite pylon 100. The lightening holes 118 essentially are material voids or cutouts in areas that the presence of material is unnecessary due to the lack of stress or reacting forces in those areas. In one embodiment, the outer structural section 120, the inner structural section 122, and the forward engine support 116 include lightening holes 118.

The above-described composite pylon 100 provides several advantages. For example, the left outer and inner airframe attachment elements 124, 142 and the right outer and inner airframe attachment elements 126, 144 form double shear connections with the left and right airframe attachment components 104, 106. Similarly, the left outer engine support element 130 and the left inner engine support element 146, and the right outer engine support element 132 and the right inner engine support element 148 form double shear connections with the left and right aft engine supports 112, 114. Sandwiching these components accommodates substantial loads and distributes loading into adjacent frame components.

The double shear components may be joined by bonding, fastening, or both. Fastening affords an additional benefit of retarding a growing dis-bond within a component or within a joining interface between components if bonded. Fastening may further afford an alternate load path should one component be unable to continue to carry a load locally.

The above-described double shear construction is discussed in context of a composite pylon for attaching an engine to an airframe, but it may be used for other structural applications such as airframe attachment interfaces and engine support interfaces. Similarly, the above-described composite pylon 100 supports an aircraft engine near the engine centerline, but an equivalent composite pylon may support an engine with a forward support located elsewhere, such as a fan case.

Various components such as the forward engine support 116 may be made of metallic and/or high temperature (hotter than elevated) composite materials to withstand high temperature and fire from the aircraft engine. In one embodiment, the outer structural section 120 may be made of heat-resistant material for withstanding elevated temperatures found near the aircraft engine. The aft engine supports 112, 114 and the airframe attachment components 104, 106 may be made of metallic materials. Using metallic materials for the attachment components and support may be advantageous because they are higher loaded areas that are subjected to more wear in the joint locations. The complex geometry can be constructed using traditional machining techniques that would be not as effective with composite materials.

The outer structural section 120 and inner structural section 122 may be continuous or may include interrupted portions (i.e., gaps). The interrupted portions limit a dis-bond propagating along an interface since a growing defect or damage cannot continue across the interruption.

The inner structural section 122 may include internal or external features such as reinforcement ribs 150 for stiffening the composite pylon 100 and for facilitating attachment of other components. Such features may be integral (simultaneously created), integrated by bonding (i.e., via overmolding, co-bonding, additive manufacturing, or the like) or assembled (e.g., via fastening). These features may be of metallic, composite, or hybrid composition and may be monolithic or an assemblage of components.

Portions of the composite pylon 100 may initially include excess material which is subsequently refined/removed to facilitate precision assembly of components. For example, features may be created by subtractive manufacturing such as machining, sanding, or drilling. The frame 102 may have any nesting direction, which may be oriented ninety degrees or any other angular orientation relative to the embodiment shown. The frame 102 is a four-sided structure, though conical, hexagonal, or other cross-sectional shapes may be employed.

The various components of the composite pylon 100 may be metallic, composite, or hybrid composition and may be monolithic or an assemblage of components. For example, the outer structural section 120 and the inner structural section 122 may be made of similar or different composite materials. This allows for greater strength in high load areas without increasing the weight of the pylon 100. To that end, different methods may be used to fabricate the outer structural section 120 and inner structural section 122. For example, the outer structural section 120 may be formed via automated fiber or tape placement on a mandrel, while the inner structural section 122 may be made via resin infused dry fiber in a single-side (open) or closed-mold tool.

Figure 8:
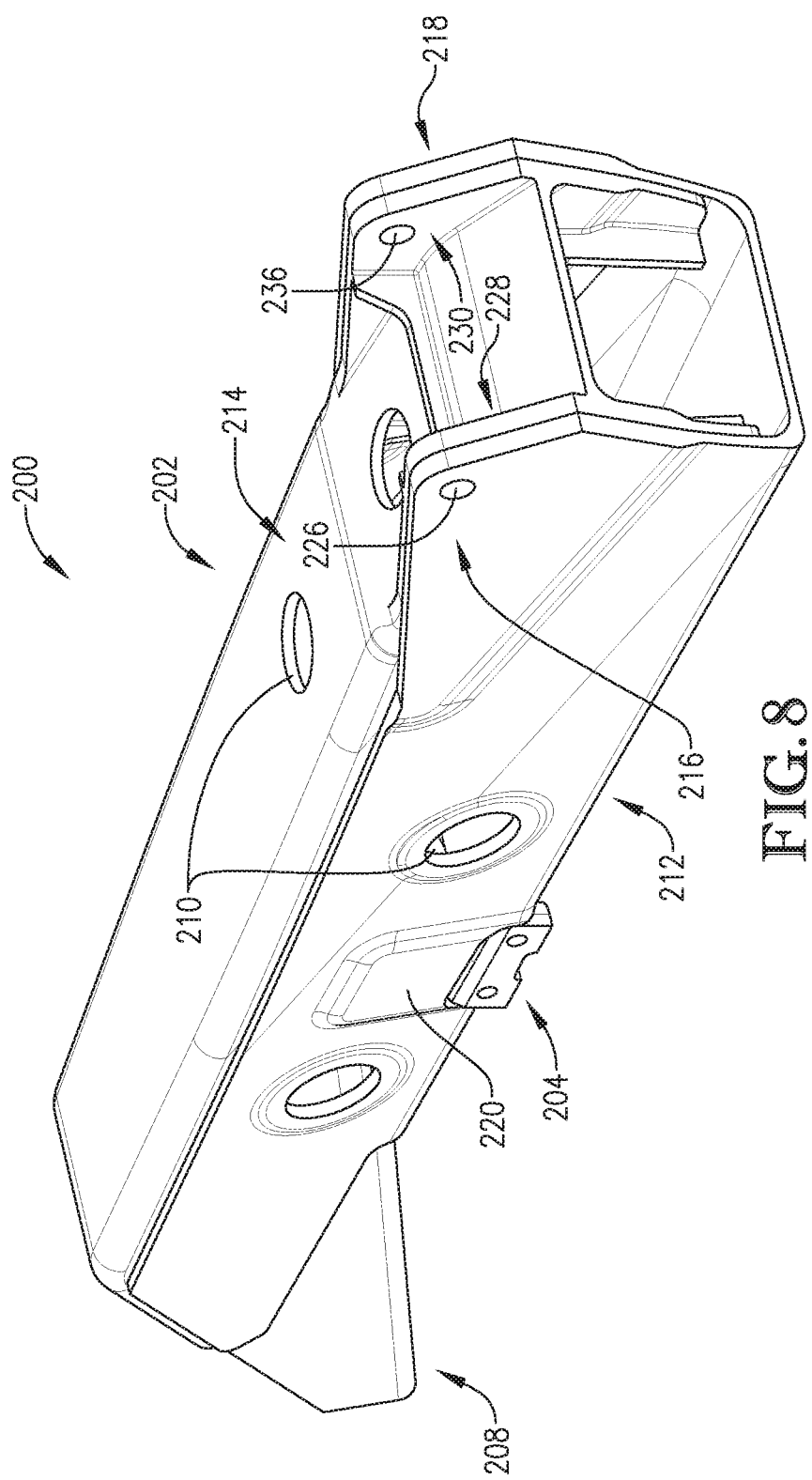
FIG. 8 is a perspective view of a composite pylon constructed in accordance with another embodiment of the invention.
Figure 9:
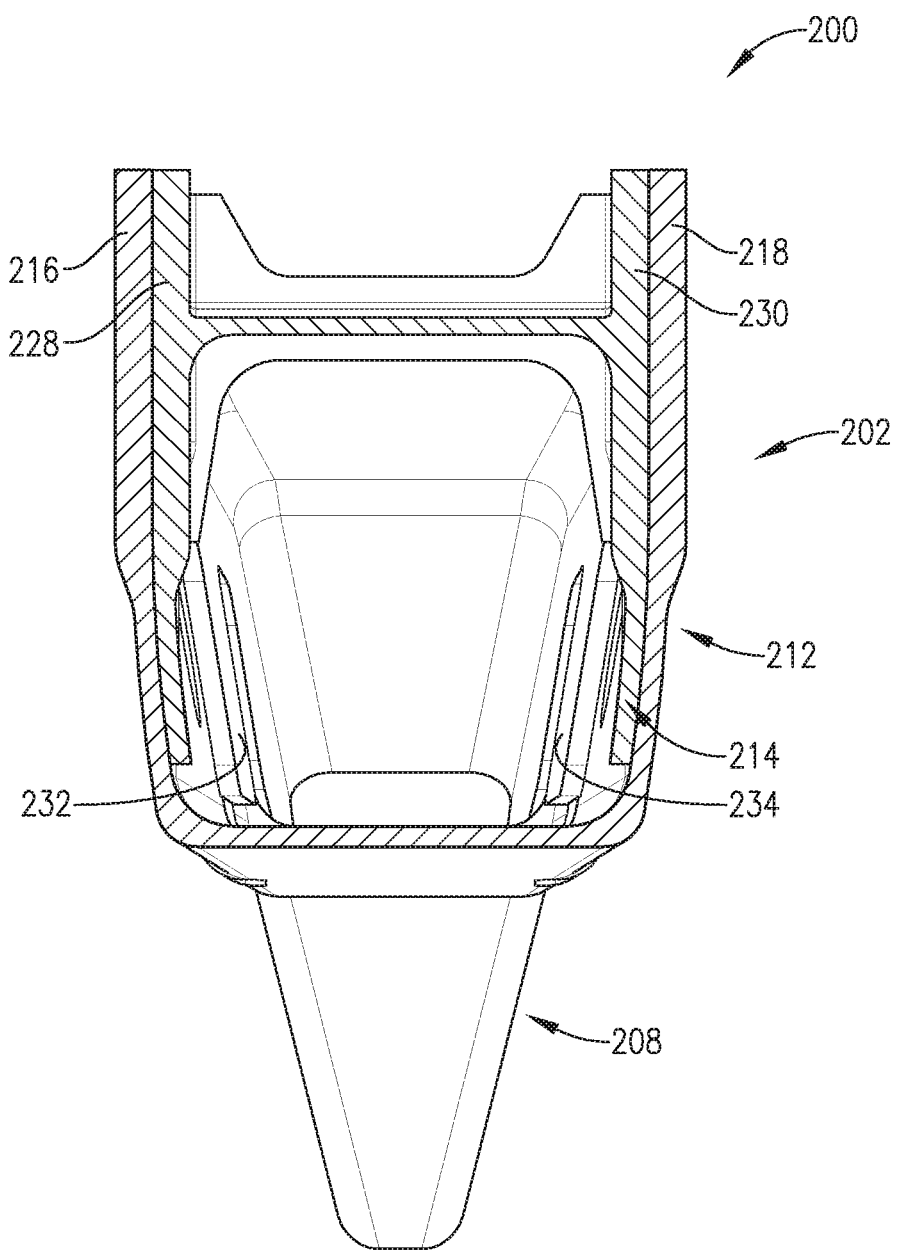
FIG. 9 is a cutaway elevation view of the composite pylon of FIG. 8.
Figure 10:
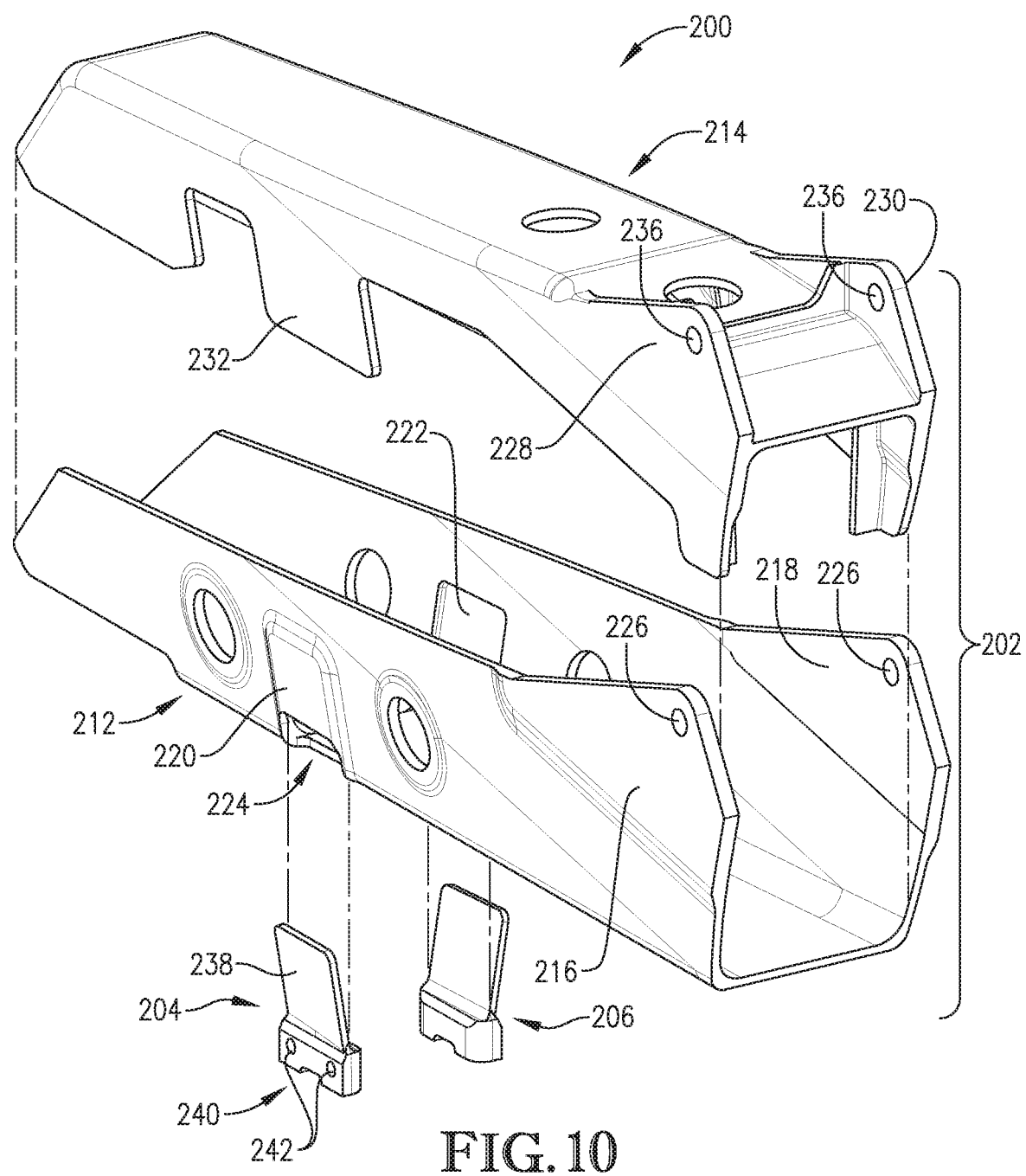
FIG. 10 is an exploded view of the composite pylon of FIG. 8.

Turning to FIGS. 8-10, a composite pylon 200 constructed in accordance with an embodiment of the invention is illustrated. The composite pylon 200 broadly comprises a frame 202, left and right aft engine supports 204, 206, and a forward engine support 208. The composite pylon 200 may also include several lightening holes 210.

The frame 202 includes an outer structural section 212 and an inner structural section 214. The frame 202 forms an elongated box or tube structure and may taper in overall cross-sectional area from its distal end to its forward end.

The outer structural section 212 is a U-shaped member including left and right outer airframe attachment lugs 216, 218, left and right outer engine support elements 220, 222, and left and right engine support openings (only left engine support opening 224 is shown). The outer structural section 212 is shown as a lower portion of the frame 202, but it may take one of several different orientations. For example, the outer structural section 212 may be an inverted U-shaped upper portion of the frame 202.

The left and right outer airframe attachment lugs 216, 218 connect the composite pylon 200 to an airframe. The left and right outer airframe attachment lugs 216, 218 are substantially similar so only left outer airframe attachment lug 216 will be described in detail.

The left outer airframe attachment lug 216 is an upward extension of the outer structural section 212 and includes a fastener hole 226. The fastener hole 226 aligns with a fastener hole of a left inner airframe attachment lug of the inner structural section 214 (described below). The left outer airframe attachment lug 216 and the left inner airframe attachment lug form fail-safe alternate load paths. The left outer airframe attachment lug 216 may be abutted by a metallic plate on an outer side or inner side of the left outer airframe attachment lug 216 (i.e., a metallic plate or metallic plates may sandwich or be sandwiched by the outer airframe attachment lug 216 and the inner airframe attachment lug).

The left and right outer engine support elements 220, 222 accommodate the left and right aft engine supports 204, 206. The left and right outer engine support elements 220, 222 are substantially similar so only left outer engine support element 220 will be described in detail.

The left outer engine support element 220 is an outwardly offset vertical portion of the outer structural section 212. The left outer engine support element 220 and a left inner engine support element of the inner structural section 214 (described below) form a space in which an anchor of the left aft engine support 204 is nested.

The left and right engine support openings receive the left and right aft engine supports 204, 206 therethrough. The left and right engine support openings are substantially similar so only left engine support opening 224 will be described in detail.

The left engine support opening 224 may be a cutout, a slot, a hole, or a material gap. The left engine left engine support opening 224 may coincide with a lower edge of the frame 202.

The inner structural section 214 is an inverted U-shaped member including left and right inner airframe attachment lugs 228, 230, and left and right inner engine support elements 232, 234. The inner structural section 214 is shown as an upper portion of the frame 202, but it may take one of several different orientations. For example, the inner structural section 214 may be a U-shaped lower portion of the frame 202.

The left and right inner airframe attachment lugs 228, 230 connect the composite pylon 200 to the airframe. The left and right inner airframe attachment lugs 228, 230 are substantially similar so only left inner airframe attachment lug 228 will be described in detail.

The left inner airframe attachment lug 228 is an upward extension of the inner structural section 214 and includes a fastener hole 236. The fastener hole 236 aligns with the fastener hole 226 of the left outer airframe attachment lug 216 of the outer structural section 211. The left outer airframe attachment lug 216 and the left inner airframe attachment lug 228 form fail-safe alternate load paths. The left inner airframe attachment lug 228 may be abutted by a metallic plate on an outer side or inner side of the left inner airframe attachment lug 228 (i.e., a metallic plate or metallic plates may sandwich or be sandwiched by the outer airframe attachment lug 216 and the inner airframe attachment lug 228).

The left and right inner engine support elements 232, 234 abut the left and right aft engine supports 204, 206. The left and right inner engine support elements 232, 234 are substantially similar so only left inner engine support element 232 will be described in detail.

The left inner engine support element 232 is a downward extending vertical portion of the inner structural section 214. The left inner engine support element 232 and the left outer engine support element 220 form a space in which an anchor of the left aft engine support 204 is nested.

The left and right engine supports 204, 206 are substantially similar so only left aft engine support 204 will be described in detail. The left aft engine support 204 includes an anchor 238 and a connection point 240.

The anchor 238 is an elongated tab sandwiched between the left outer engine support element 220 and the left inner engine support element 232 in the space. The left aft engine support 204 thereby forms a double shear connection with the outer structural section 212 and the inner structural section 214. The connection point 240 protrudes out of the left engine support opening 224 and includes a number of fastener holes 242 for connecting to an engine support link.

The forward engine support 208 extends forward from a front end of the frame 202 and may include an engine connection point. The forward engine support 208 may taper significantly more than the frame 202 and may extend diagonally downward from the frame 202. The forward engine support 208 may be sandwiched between portions of the outer structural section 212 and the inner structural section 214 to form a double shear connection therewith.

The above-described composite pylon 200 provide several advantages. The left outer airframe attachment lug 216 and the left inner airframe attachment lug 228, and the right outer airframe attachment lug 218 and the right inner airframe attachment lug 230 eliminate the need for integrating separate attachment components. These "back-to-back" lug pairs form fail-safe alternate load paths. The lugs may be further enhanced by including additional components such as a metallic plate or plates sandwiched by or sandwiching each pair of lugs.

Although the invention has been described with reference to the preferred embodiment illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A composite pylon for attaching an engine to an airframe, the composite pylon comprising:
   a frame comprising:
      a first U-shaped structural section including first and second sidewalls and forming an engine support opening through at least one of the first and second sidewalls; and
      a second U-shaped structural section including first and second sidewalls and at least partially nested in the first U-shaped structural section thereby forming a box structure;
   an aircraft attachment component for connecting the composite pylon to the airframe, the aircraft attachment component being at least partially positioned between at least one of the first sidewalls and the second sidewalls so that the frame and the aircraft attachment component forms a double shear connection therebetween; and
   an engine support for connecting the engine to the composite pylon, the engine support extending through the engine support opening and being at least partially positioned between at least one of the first sidewalls and the second sidewalls so that the frame and the engine support forms a double shear connection therebetween.

2. The composite pylon of claim 1, further comprising an upper airframe stabilizer component attached to the second U-shaped structural section.

3. The composite pylon of claim 1, further comprising an aft airframe stabilizer component attached to the first U-shaped structural section.

4. The composite pylon of claim 1, further comprising a forward engine support secured between the first U-shaped structural section and the second U-shaped structural section such that the frame forms a double shear connection with the forward engine support.

5. The composite pylon of claim 1, the airframe attachment component including a flange extending laterally over a portion of the second U-shaped structural section.

6. The composite pylon of claim 1, the first U-shaped structural section being formed of elevated temperature resistant material for withstanding elevated temperatures near the engine.

7. A composite pylon for attaching an engine to an airframe, the composite pylon comprising:
   a frame comprising:
      a first U-shaped structural section including:
         a first sidewall including a first airframe attachment element and a first engine support element and forming a first engine support opening through the first sidewall; and
         a second sidewall including a second airframe attachment element and a second engine support element and forming a second engine support opening through the second sidewall;
      a second U-shaped structural section at least partially nested in the first U-shaped structural section, the second U-shaped structural section including:
         a third sidewall including a third airframe attachment element forming a first space with the first airframe attachment and a third engine support element forming a second space with the first engine support element; and
         a fourth sidewall including a fourth airframe attachment element forming a third space with the second airframe attachment element and a fourth engine support element forming a fourth space with the second engine support element;
   a first airframe attachment component secured to the frame between the first airframe attachment element and the third airframe attachment element to form a double shear connection between the frame and the first airframe attachment component;
   a second attachment component secured to the frame between the second airframe attachment element and the fourth airframe attachment element to form a double shear connection between the frame and the second airframe attachment component;
   a first aft engine support at least partially extending through the first engine support opening and secured to the frame between the first engine support element and the third engine support element to form a double shear connection between the frame and the first aft engine support; and
   a second engine support at least partially extending through the second engine support opening and secured to the frame between the second engine support element and the fourth engine support element to form a double shear connection between the frame and the second aft engine support.

8. The composite pylon of claim 7, further comprising an upper airframe stabilizer component attached to the second U-shaped structural section.

9. The composite pylon of claim 7, further comprising an aft airframe stabilizer component attached to the first U-shaped structural section.

10. The composite pylon of claim 7, further comprising a forward engine support extending diagonally downward from a front end of the frame.

11. The composite pylon of claim 10, the first airframe attachment component, the second airframe attachment component, the first aft engine support, the second aft engine support, and the forward engine support being formed of metallic materials.

12. The composite pylon of claim 10, the forward engine support being secured between the first U-shaped structural section and the second U-shaped structural section such that the frame forms a double shear connection with the forward engine support.

13. The composite pylon of claim 7, the first airframe attachment component and the second airframe attachment component each including a flange configured to extend laterally over a portion of the second U-shaped structural section.

14. The composite pylon of claim 7, the first U-shaped structural section being formed of elevated temperature resistant material for withstanding elevated temperatures near the engine.

* * * * *